Feb. 22, 1966 W. S. CHASKIN 3,236,940

TELETYPE CODE CONTROL CIRCUITS

Filed May 24, 1962 4 Sheets-Sheet 1

WILBUR S. CHASKIN
*INVENTOR.*

BY

Flehr and Swain

ATTORNEYS

WILBUR S. CHASKIN
*INVENTOR.*

BY
Flehr and Swain
ATTORNEYS

WILBUR S. CHASKIN
*INVENTOR.*

BY

Fleht and Swain
ATTORNEYS

WILBUR S. CHASKIN
*INVENTOR.*

*BY*
Fehr and Swain
ATTORNEYS

United States Patent Office 3,236,940
Patented Feb. 22, 1966

3,236,940
TELETYPE CODE CONTROL CIRCUITS

Wilbur S. Chaskin, Menlo Park, Calif., assignor to Chaskin-Dimmick Corporation, Palo Alto, Calif., a corporation of California Filed May 24, 1962, Ser. No. 197,531
11 Claims. (Cl. 178—4.1)

This invention relates to teletypewriter code control circuits and systems and more particularly to address recognition circuits and systems for use with teletypewriter networks of the type wherein a plurality of way stations are coupled to a single central station and wherein it is desired to have a message directed from the central station to but a single one of the plurality of way stations.

In teletypewriter communication networks of the prior art there is usually employed a separate line from the central station to each of the individual way stations connected thereto. In some instances, however, a number of way stations are connected by a single line to the central station. In the latter type network, the usual manner of operation is for each of the way stations to be operated on all signals from the central station; that is, there is no distinction between messages from one station to another.

More recently there have been developed address systems for use in teletypewriter networks wherein each way station is designated by a particular precoded address. This type of system has not enjoyed widespread acceptance due to the complexity of the circuits involved and the necessary bulk and expense required.

It is, therefore, a general object of this invention to provide an improved recognition system for teletypewriter communication networks.

It is a more particular object of this invention to provide an address recognition system for teletypewriter networks of the type wherein a plurality of way stations are connected to a central station through a single teletypewriter line.

It is another object of this invention to provide an address recognition system of the aforementioned character wherein only particular letters of the usual teletypewriter code are employed.

It is another object of this invention to provide a recognition system of the aforementioned character wherein a single station may accommodate two or more addresses and wherein a corresponding number of output signals may be derived, each dependent upon the address actually transmitted.

It is still a further object of this invention to provide an address recognition system of the aforementioned character wherein teletypewriter code letters having but a single line transition are employed.

It is still another object of the invention to provide a system of the aforementioned character wherein the decoding of a letter transmitted may be accomplished by a simple binary counter.

It is a further object of this invention to provide circuits for a system of the above mentioned character.

These and other objects and features of the invention will become more clearly apparent upon a review of the following description in conjunction with the accompanying drawing, in which.

Generally the objects of the invention are accomplished by employing a teletypewriter communication network in which coded information from a central station is applied simultaneously to a plurality of way stations, only one of which is responsive to the coded information. More specifically, each message transmitted from the central station is preceded by an address code which is recognized by the intended receiver to allow only this receiver to respond to the remainder of the message. The address code utilizes the letters "M," "O," "T" and "V" for each of which only one line transition occurs, this transition being from "space" to "mark." Since the transition in each of these various letters occurs at a different time, the code may be established as a function of the transition time of the address code.

The particular receiver circuitry includes a relay which is responsive to a transmitted code "space" to allow a pulse generator to produce a train of pulses after a suitable delay occurs after the time of relay energization. The output from the pulse generator is applied to a pulse counter type of decoder. A control circuit, to which the coded address is also applied, is employed to cause subsequent readout of the counter. The control circuit serves to read the count at the time of transition from "space" to "mark"; and therefore, the number of pulses at the time of readout is a direct indication of the letter being transmitted.

The information read out from the counter is applied to a word decoder which recognizes a particular sequence of letters. The sequence of letters may be different for each receiver, or if desired, several receivers may be employed responsive to a single sequence. The recognition of the sequence by the word decoder allows the associated teletypewriter to respond to the message following that address code. Suitable timing and reset devices are incorporated in the system to recondition the circuit for proper operation.

In addition, the circuit of the invention may be employed not only to allow the respective receiver to respond to the remainder of the message, it may also be employed as a signal device such as for alarms and the like. Thus, one letter sequence may be employed to indicate an "alarm" while a second or reverse sequence may be used to indicate an "all clear" signal.

Figure 1:
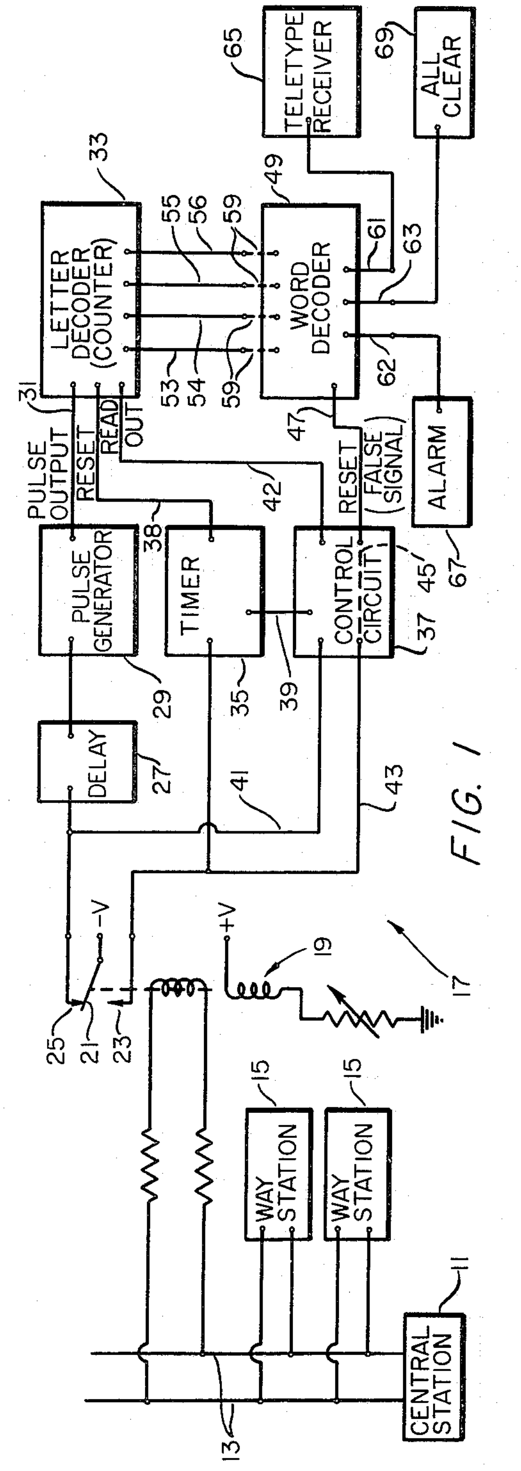
FIGURE 1 is a schematic block diagram of a system in accordance with one embodiment of the invention.
Figure 2:
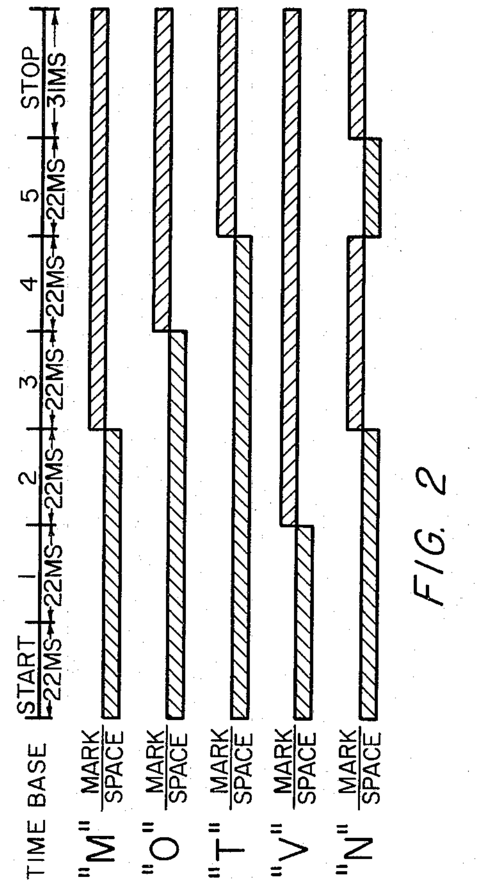
FIGURE 2 is a chart showing the teletypewriter code line transitions for the letters "M," "O," "T" and "V" which may be used in accordance with the invention. In addition, there is shown for comparison the line transitions for the teletypewriter code letter "N" which is not used in accordance with this invention.

Referring more particularly to the drawings, there is shown in FIGURE 1 a schematic block diagram of one system in accordance with the invention. In FIGURE 2 there is shown the transition time of the various code letters used in the system as shown in FIGURE 1. In addition, there is shown in FIGURE 2 the transition times of the teletypewriter code letter "N" which is not used in the system in accordance with the invention.

Referring then particularly to FIGURE 2, there is shown a time base line wherein the time base of a single letter is subdivided into seven bit times. The first of these is a "start" bit. The next five bits are information bits, while the last is a "stop" bit. The start bit and each of the information bits is, in a sixty word per minute teletypewriter code, of 22 millisecond duration. The stop bit is ordinarly of 31 millisecond duration. In teletypewriter systems employing a different number of words per minute the time base is proportionately increased or reduced.

Referring to the transition charts it is noted that the start bit of each letter is a "space" in the usual teletypewriter connotation. The stop bit, on the other hand, is a "mark." For the letter "M" the start bit and the immediately following two information bits are "spaces." These three "spaces" and then followed by three "marks," each of 22 millisecond duration, and a final "stop" bit which is a "mark" of 31 millisecond duration. Similarly, for the letters "O," "T" and "V," the initial start bit, which is a "space," is immediately followed by a number of information bits which are also "spaces." Subsequently, there are a number of "marks" and the final stop bit which is also a "mark." Thus, it is seen that for each of the letters "M," "O," "T" and "V," there is but a single transition from "space" to "mark" and no transition from "mark" to "space." Comparing these letters to the normal teletypewriter code letter "N," it is noted that after the initial start bit there are two information bits which are also "spaces" followed by two information bits which are "marks." However, an additional "space" intervenes prior to the final stop "mark." Thus, there is noted that in the letter "N" there are three transitions; two from "space" to "mark" and one from "mark" to "space."

Figure 3:
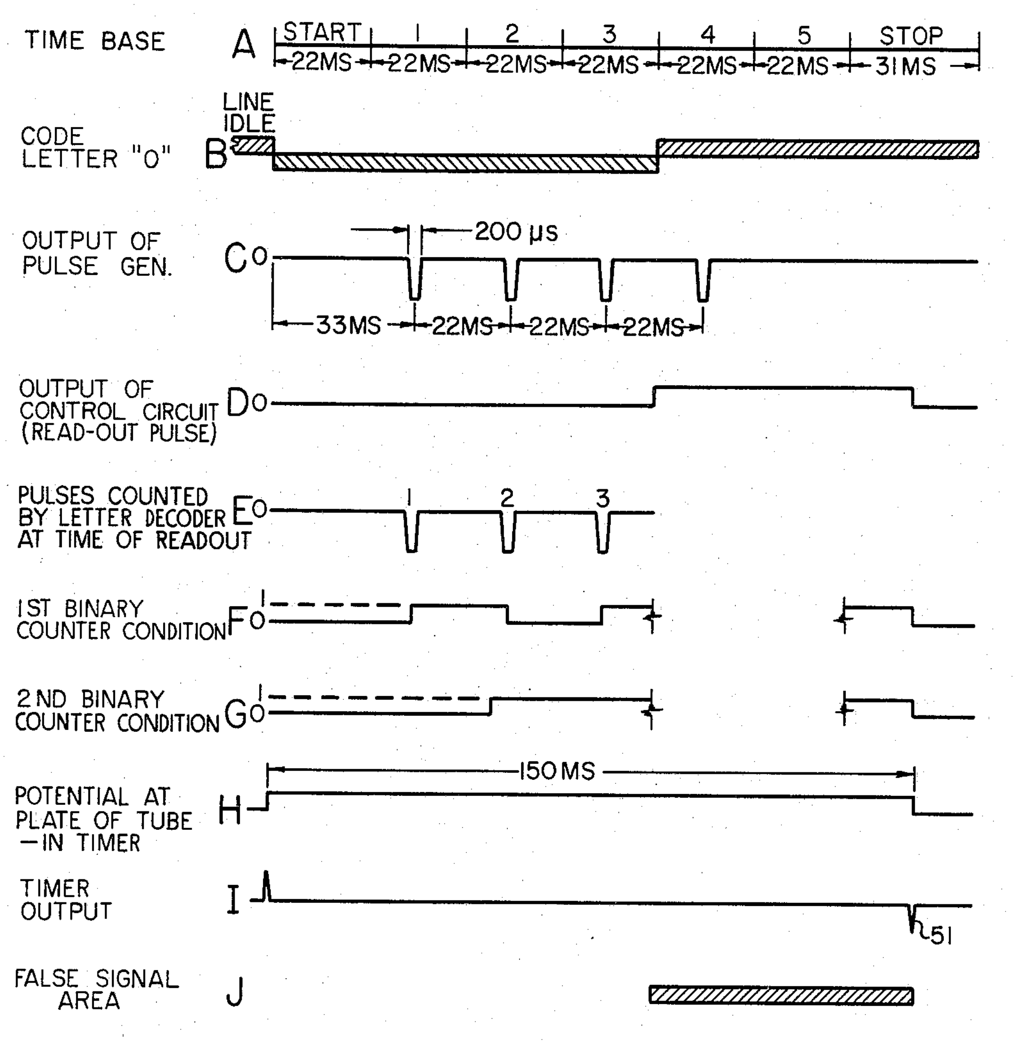
FIGURES 3A through 3J are a series of timing charts indicating the operation of the system of FIGURE 1 during the receipt of an exemplary code letter "O"

The description and operation of the system may be understood with these code letters in mind and upon a review of FIGURE 1 together with FIGURE 3, which is a timing and voltage chart for various portions of the system of FIGURE 1 when operated upon the receipt of a code letter "O" which is used as an example.

Thus, there is shown a central station 11 having a teletypewriter line 13 connected thereto. There are a plurality of way stations, indicated schematically as 15, and a more detailed indication of way station 17. The stations 15 and 17 may be identical, except, perhaps, for a different code address employed by the individual circuits thereof. Each of the stations, station 17 being taken as typical, includes a polarized relay 19 connected across the teletypewriter line 13. The polarized relay follows the transitions on the line 13 and upon the occurrence of each "space" the relay is energized to move its wiper 21 to the contact 23. Normally, however, when the line is idle or when a "mark" is being transmitted the wiper 21 remains on its contact 25.

The contact 25 is connected through a delay 27 to the pulse generator 29. The delay 27 serves to delay the action of the pulse generator by a time which is equivalent to the time length of the "start pulse" plus one-half the time length of the first "space" pulse; in the exemplary case shown, 33 milliseconds. The pulse generator 29 may be a multivibrator of the free running type and serves to produce pulses of 200 microsecond duration with 22 milliseconds spacing.

When the wiper 21 is on its contact 25 a negative voltage —V is applied through the delay 27 to the pulse generator to inhibit its operation. When the wiper 21 is moved to the contact 23, however, —V is removed and after the time lapse caused by the delay 27 the pulse generator 29 begins to operate to produce output pulses as shown in FIGURE 3C, the pulse output from the generator 29 being applied through a line 31 to a letter decoder 33 which will be explained hereinafter.

A timer 35 is connected to the contact 23 of the polar relay and the contact 25 is connected to both the timer 35 and a control circuit 37. The function of the timer 35 is two fold. It serves by means of a pulse on the line 38, to cause the letter decoder 33 to be reset. In addition it cooperates with the control circuit 37 through the line 39 to determine whether more than one line transition has occurred within a prescribed time; the prescribed time being approximately the time of transition of one letter of teletypewriter code. The timer then may be considered as a one shot multivibrator which is turned on when —V is connected thereto upon movement of the wiper 21 to the contact 23.

As shown in FIGURE 3H, the period of the one shot multivibrator of the timer 35 may be 150 milliseconds. It is noted that the 150 millisecond period is initiated coincident with the receipt of the first space as shown in FIGURE 3B and terminates approximately in the middle of the stop bit rather than extending the entire 163 milliseconds of letter transmission time. This shortening of the timing period permits variations due to line distortion and the like without similar variations in the operation of the recognition circuit. Since the timer 35 is a one shot multivibrator one output may be employed and applied to the control circuit as a lock, the control circuit 37 being itself a multivibrator of the bistable type. Thus, during those periods when the timer 35 is not producing its 150 millisecond pulse, the control circuit 37 is locked in one condition. On the other hand, during the time of the 150 millisecond pulse produced by the timer, the control circuit is unlocked whereby its operation may be determined by the movement of the wiper 21. For this purpose the contact 25 is connected to the control circuit through the line 41. Thus, when the wiper 21 returns to the contact 25, the control circuit 37 applies a pulse along the line 42 to read out the letter decoder 33. As seen in FIGURE 3, when the letter "O" is transmitted, a mark pulse is received which is the fourth information bit to return the wiper 21 to the contact 25. Upon the receipt of this pulse —V is applied to the control circuit 37 which causes it to read out the letter decoder 33.

If, however, during the same 150 millisecond pulse of the timer 35, the wiper 21 again returns to the contact 23, thus indicating a second transition in the same letter, —V is applied to the contact 23, through the line 43, an auxiliary circuit within the control circuit 37 itself (shown schematically by the dashed line 45), and through the line 47 to reset the word decoder 49 which will be described hereinafter. Thus, the timer 35 and the control circuit 37 also serve to indicate whether a letter is received which has more than a single transition, as for example, the letter "N." It should be noted further that the letter "O" shown in FIGURE 3B as well as with the other particular code letters employed, the wiper 21 will be moved to the contact 23 but a single time during the transmission of a single letter.

The previously mentioned letter decoder 33 may be a conventional binary counter. In the example described where there are but four single transition letters employed, that is letters "M," "O," "T" and "V," the decoder 33 may be a two stage binary counter.

The operation of the two stage binary counter of the decoder 33 is shown in FIGURES 3F and 3G. Thus, upon the receipt of the first output pulse from the generator 29, the condition of the first stage is changed as shown in FIGURE 3F. Upon the second pulse the condition of both the first and the second stages are changed and upon the receipt of the third pulse the condition of the first stage alone is again changed. With respect to the code letter "O" being transmitted, it is noted that after the third pulse is produced by the generator 29 the control circuit 37 applies the readout pulse through the line 42 to cause the letter decoder 33 to be read out into the word decoder 49.

Although an additional pulse is produced, as shown in FIGURE 3C (due to the initial start pulse), this pulse occurs after the time of readout and is, therefore, of no consequence.

At the end of the 150 millisecond period of the timer 35 an output pulse 51, FIGURE 3I, is produced which is applied along the line 38 to reset both stages of the binary counter shown in FIGURES 3F and 3G.

The output of the letter decoder 33 is applied through the lines 53–56 to the word decoder 49. Each of the lines 53–56 may be associated with a particular one of the letters "M," "O," "T" or "V" used in conjunction with the system. The preselected code which may produce an output from the word decoder may be considerably altered by means of jumpers 59. The word decoder may be a matrix decoder of the type which recognizes a particular sequence of energization of the various input terminals. Thus a relay matrix is one particular type of decoder which may be employed. Moreover, the decoder may be such as to recognize not only a single sequence but several sequences to produce individual outputs corresponding to the sequence of letters actually received. One or more output lines 61–63 may, therefore, be employed. The number of output lines may, if desired, be further increased by employing a decoder which recognizes a greater number of sequences.

By way of example the output through the line 61 may be applied to a teletypewriter receiver 65 and thus serve, upon the recognition of a particular address, to initiate operation of the teletypewriter receiver. To provide this function the line relay of the teletypewriter receiver itself may be inactivated until the particular address is recognized. Other outputs such as those on the lines 62 and 63 may be connected to "alarm" and "all clear" signalling devices such as may be used for national or local emergencies.

Figure 4:
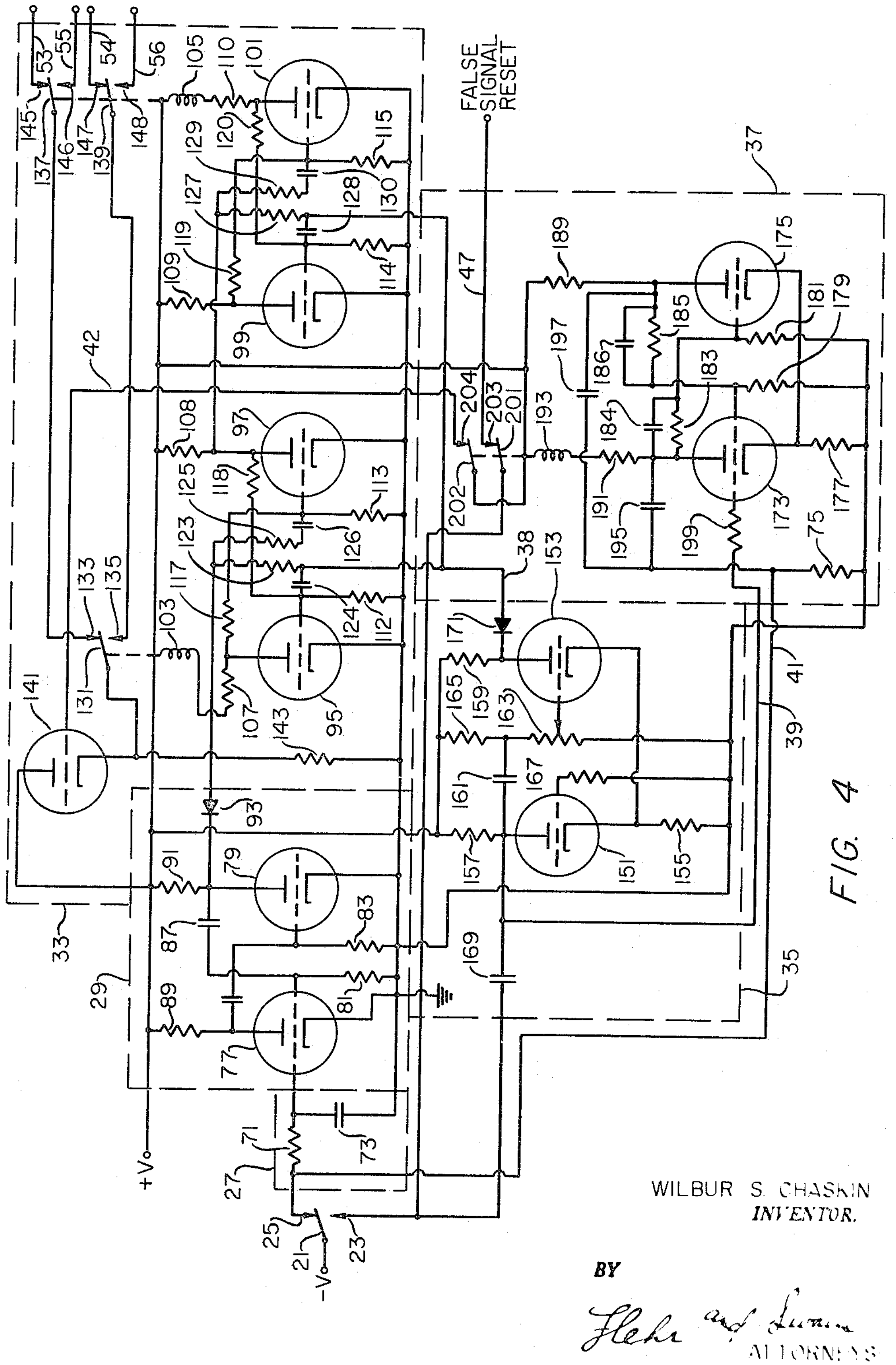
FIGURE 4 is a circuit diagram of the system shown in FIGURE 1 but not showing the word decoder indicated therein.
Figure 5:
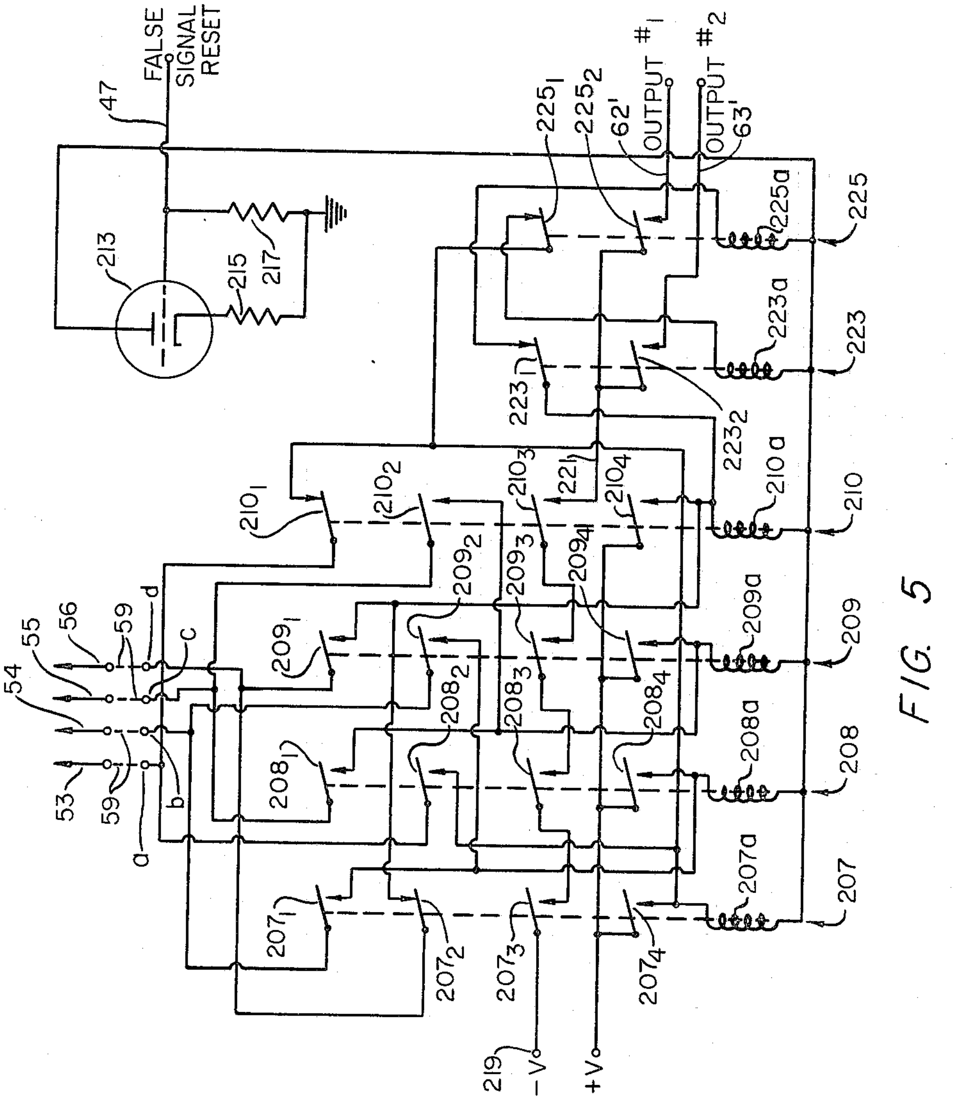
FIGURE 5 is a schematic circuit diagram of a word decoder as shown in FIGURE 1 in accordance with one embodiment of the invention.

Having generally described the system of the invention, one particular circuit utilizing the principles thereof is shown in FIGURES 4 and 5. In FIGURE 5 the word decoder 49 is shown while in FIGURE 4 that portion of the recognition circuit prior to the word decoder is depicted. In the word decoder of FIGURE 5 there are shown but two outputs. Other variations however will become obvious upon understanding the decoder itself.

Referring to FIGURES 4 and 5, those elements corresponding to elements shown in FIGURE 1 bear similar reference numerals. Thus, it is shown that the delay circuit 27 includes a resistor 71 connected between the contact 25 and the pulse generator 29 together with capacitor 73 connected between the pulse generator input and ground. Thus, when the wiper 21 (FIGURE 1) is impressed against the contact 25 the capacitor 73 is charged to a negative potential. Upon release of the wiper 21 from the contact 25 the capacitor begins to discharge to the resistor 71, line 41 and the resistor 75 (a portion of the control circuit 37) to ground. Upon discharge of the capacitor 73, operation of the pulse generator 29 is no longer prevented.

The pulse generator 29 itself comprises a free running multivibrator including tubes 77 and 79, each of which has its grid connected to ground through the resistors 81 and 83 respectively. The plates and grids of tubes 77 and 79 are cross coupled through suitable coupling capacitors. The plate of each of the tubes 77 and 79 is connected to a source of positive potential +V through the respective resistors 89 and 91. The cathode of each tube is connected to ground.

Thus it is apparent that as long as the capacitor 73 is charged to a negative potential, tube 77 is held in its nonconducting condition to prevent operation of the pulse generator. Upon release of this negative potential the generator produces a series of pulses as shown in FIGURE 3C. These pulses are passed through a rectifying diode 93 and the line 31 to the letter decoder 33.

The letter decoder includes a first stage binary counter comprising tubes 95 and 97 and a second stage counter including the tubes 99 and 101. It is noted that the tubes 95 and 101 include relay coils 103 and 105 respectively, in their plate circuits. In addition, the plate circuit of each of the tubes in the counter includes a load resistance 107–110. The cathode of each of the tubes is connected to ground while the grid of each is returned through the resistors 112–115. The grids and plates of each stage of the counter are cross coupled through the resistors 117–120. Input pulses are applied to the first stage binary counter from the line 31 through isolating resistors 123 and 125 and the capacitors 124 and 126. The resistors 123 and 125 serve to conveniently permit reset of the counter by application of a voltage pulse to the desired tube as described hereinafter.

Likewise, the output of the tube 97 is applied as an input to the second stage counter through isolating resistors 127 and 129 and the capacitors 128 and 130. The condition of the first stage binary counter changes upon the application of each pulse on the line 31 while the condition of the second stage binary counter, including the tubes 99 and 101, changes upon the application of alternate pulses on the line 31.

A relay wiper 131 is operatively connected to the relay coil 103 and has associated therewith two stationary contacts 133 and 135. The contact 133 is electrically connected to the wiper 137 of a second relay while the contact 135 is electrically connected to the wiper 139 of the same second relay. Wipers 137 and 139 are operatively connected to the relay coil 105 in the plate circuit of the tube 101.

The wiper 131 is connected to a cathode follower circuit including the tube 141 and cathode resistor 143. The tube 141 has its plate connected to a source of positive potential +V and its grid connected to the line 42 which receives the readout pulses from the control circuit 37.

The wipers 137 and 139 are each associated with a pair of fixed contacts 145–148. Each of the contacts 145–148 is connected through the lines 53 through 56 to the word decoder 49 (FIGURES 1 and 5). The count required for an output on either of the lines 53–56 is parenthetically indicated. Thus, upon the count of one, an output may be produced along the line 56 due to the fact that the wiper 131 is impressed against the contact 135 and the wiper 139 impressed against the contact 148. In order to produce a count of one, the tubes 95 and 101 are in their conducting state. Similarly for the count of two, the tubes 97 and 99 are in their conducting stage, while for the count of three the tubes 95 and 99 are in their conducting state. For the count of four the tubes 97 and 101 are in their conducting state.

It should be realized that more is required for an output along the lines 53–56 than that the proper tubes 95, 97, 99 or 101 are in their proper conducting state. In addition, there must be a voltage impressed upon the wiper 131. This voltage is applied from the cathode follower circuit including tube 141 and the resistor 143. The cathode follower circuit is energized upon energization of the line 42 by the control circuit. During the actual application of pulses from the generator 29 the counter is in continuous operation. In the course of this count, however, the line 42 will be energized and the count, at that instant, will be read through one of the lines 53–56. Reset of the letter decoder will be described hereinafter.

The timer 35 comprises a one shot multivibrator including the tubes 151 and 153. These tubes employ a common cathode resistor 155 and the plates of each of the tubes is connected to the source of positive potential +V through the resistors 157 and 159 respectively. The plate of the tube 151 is coupled to the grid of the tube 153 by a capacitor 161 on the upper portion of a potentiometer 163. The lower portion of the potentiometer 163 is connected to ground. The potentiometer 163 in conjunction with the resistor 165 forms a voltage divider between ground and the source of positive potential such that the period of the multivibrator may be adjusted thereby. The grid of the tube 151 is returned to ground through the resistor 167.

As long as the wiper 21 is impressed against the upper contact 25 of the polarized relay, the tube 153 conducts while the tube 151 is cut off. Upon receipt of a start pulse the wiper 21 applies −V to the contact 23 and a negative pulse is passed through a coupling capacitor 169 and the capacitor 161 to the voltage divider including resistor 165 and potentiometer 163 to the grid of the tube 153 thereby turning that tube off and turning tube 151 on. Conduction of tube 151 initiates the 150 millisecond pulse as shown in FIGURE 3H. After 150 milliseconds, tube 153 again conducts and the voltage of the plate thereof drops to produce (at the grids of the tubes 95 and 99 in the letter decoder 33), the pulse 51 shown in FIGURE 3I. This pulse is produced through the rectifying diode 171 and the respective capacitors 124 and 128 to the tubes 95 and 99. Thus, the counter 33 is reset in the condition that tubes 97 and 101 are conducting. With these tubes in the conducting stage, it is noted that the cathode follower 141 is connected to the line 55. However, at this point of operation the cathode follower is inoperative since no voltage is applied through the line 42 to the grid of tube 141.

The control circuit 37 comprises a bistable multivibrator or flip-flop including the tubes 173 and 175. The cathodes of these tubes are connected to ground through a common resistor 177 while the grids are returned to ground through the resistors 179 and 181 respectively. Moreover, the grids and plates of the tubes 173 and 175 are cross coupled by means of the resistor-capacitor pairs 183–184 and 185–186, respectively. The plate of the tube 175 is connected to a source of positive potential through the resistor 189 while the plate of the tube 173 is coupled to the source of positive potential through the resistor 191 and relay coil 193.

Input in the form of negative pulses is applied to tubes 173 and 175 from the contact 25 and line 41 across the resistor 75 and through the capacitors 195 and 197 respectively. It is also noted that the grid of the tube 173 is connected to the plate of the tube 151 in the counter 35 through the resistor 199. Thus, when the tube 151 is not conducting positive voltage is applied on the grid of tube 173 and the control circuit is locked in the condition such that the tube 173 conducts.

However, during the 150 millisecond period of the timer 35 the tube 151 is conducting thereby freeing operation of the control circuit 37. Thus, after the initial start pulse the control circuit 37 is free to operate. However, no change in operating status occurs at this time due to the fact that no input is applied. Subsequently, upon the receipt of a "mark" the wiper 21 is impressed against the contact 25 and negative voltage is applied on the line 41 thereby causing a change in the condition of the timing control circuit 37. At this point the tube 175 begins conducting and the wipers 201 and 202 are released to their stationary contacts 203 and 204. Positive potential is applied through the wiper 202, the contact 204 and the line 42 to energize the tube 141, thereby applying a readout pulse through the line 54 (using the letter "O" in the example whereby three pulses are counted). At the same time the wiper 201 is impressed against the contact 203 whereby the line 47 is connected to the contact 23 of the polarized relay. Thus, if during the period of the 150 millisecond pulse of the timer 35, there occurs a subsequent "space" the negative potential will be applied to the line 47 through the contact 23 of the polarized relay, the wiper 201 and the contact 203. Thus, the false signal area designated in FIGURE 3J is provided in that time between the initial transition from "space" to "mark" and the end of the 150 millisecond pulse of the timer 35.

Referring to FIGURE 5 there is shown one embodiment of a word decoder which may be used in accordance with this invention. As shown in FIGURE 1, the word decoder includes three outputs while that shown in FIGURE 5 includes only two outputs, numbered 1 and 2. Upon a review of the description of this decoder, however, the method of employing additional outputs will become obvious.

The word decoder includes a relay for each of the letter inputs possible. Thus, in this instance there are four relays 207–210 each including a coil 207*a*– 210*a* and each including four contacts designated by the subscripts 1 to 4.

The contacts designated by the subscript 1 may be considered forward decoding contacts, and those designated by the subscript 2 may be considered the reverse decoding contacts. The contacts designated by subscript 3 may be considered the output contacts while those designated by the subscript 4 may be considered latching contacts.

It will be noted that upon energization of any one of the relays 207–210 its associated contact $207_4$–$210_4$ latches that particular relay in its energized condition by connecting its respective coil 207*a*–210*a* to a source of positive potential +V. The other side of each of the coils 207*a*–210*a* is connected to ground through the tube 213 which is normally biased in a conducting state by the resistors 215 and 217. However, upon application of a negative voltage on the line 47 (see also FIGURE 4) the tube 213 is cut off and each of the relays 207–210 is de-energized.

The word decoder 49 includes input contacts lettered *a*, *b*, *c*, and *d* which are connected by means of jumpers 59 to the lines 53–56. Obviously the connection of the lines 53–56 with either of the inputs *a*, *b*, *c*, or *d* may be rearranged whereby different codes would be recognized by the word decoder. In the particular example shown the forward code may be considered the word "M–O–T–V" while reverse code will be considered the letters "V–T–O–M." The code may easily be changed, for instance, by reversing the connection of the lines 53 and 54 with respect to input terminals *a* and *b*.

Considering as an example the input code word "M–O–T–V" the first code letter to be recognized by the circuit shown in FIGURE 4 would be the first code letter M. An output through the circuit of FIGURE 4 would be produced along the line 53. This pulse will pass through the normally closed contacts $210_1$ to the upper side of the relay coil 207*a*. Thus the relay coil 207*a* will be energized momentarily. The latching contact $207_4$ will continue energization of the relay 207*a* even after termination of the pulse through the line 53.

If the next letter input to the word decoder is a letter "O" pulse will be applied from the line 54 through the now closed contacts $207_1$ to the upper side of the relay coil 208*a*. Thus, the relay 208 is energized and a subsequent pulse, if it is along the line 55 (indicating the receipt of the letter "T") will be passed through the now closed contacts $208_1$ to energize the relay 209. If the following pulse is on the line 56 it will be passed along the now closed contacts $209_1$ to energize the relay 210.

At this point all of the contacts $207_3$, $208_3$, $209_3$ and $210_3$ will be closed whereby an output voltage V may be applied from the terminal 219 to the line 221. If there is received a code letter other than "M," "O," "T," or "V" even after certain ones of the relays 207–210 have been energized a "false signal" voltage is developed by means of the circuit shown in FIGURE 4 to de-energize the tube 213. Thus, the entire word decoder shown in FIGURE 5 will be reset. As an example it may be assumed that the word "motive" has been transmitted as part of a normal message in the teletype code. Although the first three letters *"m," "o"* and *"t"* of this word would serve to energize the relays 207, 208 and 209, the subsequent receipt of the letter *"i"* would cause the circuit of FIGURE 4 to apply a negative voltage on the line 47. At this point the tube 213 would be made non-conductive and each of the relays 207, 208 and 209 would be de-energized thereby completely resetting the word decoder.

If but a single output is desired the circuit thus far described (and omitting the relay contacts $207_2$–$208_2$–$209_2$–$210_2$) is sufficient. This output may be employed to activate a teletypewriter receiver or to initiate any other function. However, if it is desired to employ a decoder wherein reverse or alternate sequences are permissible the contacts designated by subscript 2 together with additional relays are required. In the instance shown wherein there are two outputs there will be required two additional relays 223 and 225. Each of the relays 223 and 225 includes a relay coil 223*a* and 225*a* together with contacts designated with subscripts 1 and 2. Again referring to the code word "M–O–T-V" the signal designating the initial code letter "M" on the line 53 will, in addition to energizing the coil 207*a*, energize the coil 223*a* through the closed contacts $225_1$. Energization of the relay 223 opens the contacts $223_1$ thereby opening the energization circuit for the relay 225. Consequently, the particular output to be employed is selected by the initial letter input to the word decoder. Operation of the relay 223 connects the output line 221 to the line 63′ whereby output number 2 is energized when each of the contacts $207_3$, $208_3$, $209_3$ and $210_3$ are closed.

If the code word were transmitted in the reverse sequence, that is "V–T–O–M" in the example shown in FIGURE 5, the first code letter "V" which is received at the terminal *d* will be applied through the normally closed contacts $207_2$ to energize relay 210.

This initial input at the terminal *d* will also be applied through the normally closed contacts $223_1$ to energize the relay 225. Thus an output will be permitted through the contacts $225_2$ when the output voltage is present on the line 221. Also operation of the relay 223 is prevented by opening the contacts $225_1$.

Subsequent code letters "T," "O" and "M" in sequence, will energize the relays 209, 208 and 207 respectively, whereby each of the contacts $207_3$, $208_3$, $209_3$ and $210_3$ will be closed.

If additional outputs are desired additional contacts for each of the relays 207–210 may be connected such that the initial letter of the additional code letter sequence will be connected through normally closed contacts to one of the relay coils 207–210. In addition, there will be required an additional relay similar to the relays 223 and 225 which will likewise be energized upon receipt of the initial letter.

In the embodiment shown output number 1 may be considered an "alarm" output and when the line 62′ is energized an alarm signaling device 67 (in FIGURE 1) may be energized. In addition, output number 2 may be considered an "all clear" signal and when the line 63′ is energized an "all clear" signaling device (FIGURE 1) may be energized. An additional output may be employed as mentioned above to cause operation of the teletypewriter receiver. In addition, the relays 223 and 225 may be entirely eliminated together with the relay contacts $207_2$–$210_2$ whereby the word decoder recognizes but a single sequence of letters. This sequence of letters may be employed in any manner desirable including the "alarm" or "all clear" signals as well as in a system as shown in FIGURE 1 to energize a teletypewriter receiver.

Thus, it is seen that an improved code control circuit is provided which employs code letters having but a single line transition. It is apparent from a review of the circuits shown that the device is extremely economical and of relatively small bulk whereby it may be readily attached to existing teletypewriter receivers.

It should be realized that the circuit shown in FIGURES 4 and 5 have omitted certain conventional components which are well known to those skilled in the art, such as biasing means for the cathode follower 141 and de-biasing means for the various relays. The values of the various components required in the circuit shown in FIGURES 4 and 5 may be easily calculated by those skilled in the art once the value of the available potentials are determined. Moreover, it should be realized that although the circuit diagram shows and describes vacuum tubes that various other devices may be employed such as transistors, magnetic amplifiers, or other solid state devices.

I claim:

1. In a binary coded system of the type wherein each letter or character employed is designated by a code employing bits having two possible conditions, a letter or character recognition system comprising:

means for receiving a signal corresponding to said letters or characters;

first recognition means for recognizing only letters or characters having but a single transition from one of said conditions to the other of said conditions;

means for counting the letters or characters recognized by said first recognition means;

second recognition means for recognizing only letters and characters having a second transition from one of said conditions to the other of said conditions;

output means for producing an output dependent upon the number of letters or characters recognized by said first recognition means; and means responsive to said second recognition means for disabling said output means from producing an output when a letter or character has a second transition.

2. A teletypewriter communication network utilizing binary coded signals of equal length on a time scale for representing each letter or character and in which a starting bit is followed by at least one coding bit and a stop bit comprising: a central station, a plurality of way stations, a transmission line interconnecting said central station and each of said way stations, at least one of said way stations including an address recognition circuit, said address recognition circuit including relay means responsive to the binary coded signal transmitted over said transmission line, a pulse generator, said relay means being responsive to one condition of the binary coded signal to initiate operation of said pulse generator and to the other condition of the binary coded signal to turn off said pulse generator, pulse counting means for receiving and counting the output pulses from said pulse generator, means responsive to the other condition of the binary coded signal on said transmission line for reading out said pulse counting means, and means for receiving the output of said counting means, said last named means being responsive to the number of changes of conditions of the binary coded signal during the coding bits and operative to reset itself when the number of changes of condition exceeds one.

3. A teletypewriter communication network comprising a central station, a plurality of way stations, a transmission line interconnecting said central station and each of said way stations, at least one of said way stations including an address recognition circuit, said address recognition circuit including relay means responsive to a signal adapted to be transmitted over said transmission line, a pulse generator, said relay means being responsive to signals of one polarity on said transmission line to initiate operation of said pulse generator, pulse counting means for receiving and counting the output pulse from said pulse generator, means responsive to signal on said transmission line of an opposite polarity for reading out said pulse counting means, and means for receiving the output of said pulse counting means and decoding the same, said last named means being responsive to the total number of changes of polarity of the signal on said transmission line within a predetermined time interval and operative to disable itself from receiving the output of said pulse counting means when the number exceeds a predetermined number, whereby a particular sequence of outputs from said pulse counting means may be recognized only if the number of changes in polarity does not exceed said predetermined number.

4. A teletypewriter communication network of the type employing coded letters or characters employing bits having two possible conditions comprising a central station, a plurality of way stations, a transmission line interconnecting said central station and each of said way stations, at least one of said way stations including an address recognition circuit adapted to recognize a predetermined combination of letters or characters, said predetermined letters or characters including only those having a single transition from one of said possible conditions to the other, said address recognition circuit including relay means responsive to a signal adapted to be transmitted over said transmission line, a pulse generator, said relay means being responsive to signals on said transmission line corresponding to one of said possible conditions to initiate operation of said pulse generator, pulse counting means for receiving and counting the output pulses from said pulse generator, and means responsive to signals on said transmission line corresponding to the other of said possible conditions for reading out said pulse counting means, means for receiving the output of said pulse counting means and decoding the same, whereby a particular sequence of letters or characters received by said recognition circuit may be recognized, and means responsive to a second transition in the received signal corresponding to a single letter from one of said possible conditions to the other for disabling the means for receiving and decoding the output of the pulse counting means.

5. A network as defined in claim 4 wherein said pulse counting means comprises a binary counter, relay means associated with each stage of said binary counter for energization in response to the condition of that stage, said relay including at least one wiper together with a forward and a back contact operatively associated with that wiper, said forward and back contacts being connected as outputs of the counter, and a source of voltage connected to said wiper.

6. A network as defined in claim 5 wherein said source of voltage is selectively coupled to said wiper, and wherein said means responsive to signals on said transmission line corresponding to the other of said possible conditions is responsive to complete the connection of said source of voltage to said wiper.

7. A network as defined in claim 4 wherein the means for receiving and decoding the output of the pulse counting means comprises a bank of relays, one relay for each letter of a predetermined code word, each of said relays having first, second and third contacts, the first contact of each relay being connected as a holing contact for its respective relay, the second contact of each relay being connected in series, a source of voltage connected to one end of the series connected second contacts, the other end of the series connected second contacts serving as an output terminal, the third contact of one of said relays being normally closed, an input terminal means connected through the normally closed contact to the coil of one of said relays, whereby an input will energize one of the relays, the third contact of each of the other of said relays being normally open and having one side connected to the coil of a different one of said relays, the other side of the third contact of each of the other of said relays being connected to one of said input terminal means.

8. A network as defined in claim 7 wherein the means for disabling the means for receiving and decoding the output of the pulse counting means comprise means for de-energizing each of said relays.

9. A decoding network comprising a bank of relays, one relay for each letter of a predetermined code word, each of said relays having first, second and third contacts, the first contact of each relay being connected as a holding contact for its respective relay, the second contact of each relay being connected in series, a source of voltage connected to one end of the series connected second contacts, the other end of the series connected second contacts serving as an output terminal, the third contact of one of said relays being normally closed, an input terminal means connected through the normally closed contact to the coil of one of said relays, whereby an input will energize one of the relays, the third contact of each of the other of said relays being normally open and having one side connected to the coil of a different one of said relays, the other side of the third contact of each of the other of said relays being connected to one of said input terminal means.

10. A decoding network as defined in claim 9 wherein each of said relays includes a fourth contact, one of said fourth contacts being normally closed and interconnecting said input terminal means with the coil of one of said relays, the other of said fourth contacts being normally open and having one side connected to the coil of a different one of said relays, the other side of each of said fourth contacts being connected to said input terminal means whereby the third and fourth sets of contacts may be employed to recognize two different code sequences.

11. A decoding network as defined in claim 10 together with two additional relays, one of said relays being connected to the normally closed third contact, the other of said relays being connected to the normally closed fourth contact, each of said additional relays including a contact having one side connected to said other end of the series connected second contacts, the other side of the contacts of the additional relays being connected as outputs whereby a different output may be obtained for the different recognized code sequences.

References Cited by the Examiner

UNITED STATES PATENTS

| | | | |
|---|---|---|---|
| 2,613,267 | 10/1952 | Durkee | 178—33 |
| 2,628,277 | 2/1953 | Spencer | 178—33 |
| 2,953,772 | 9/1960 | Coley | 340—164 |
| 2,993,955 | 7/1961 | Neiswinter | 178—4.1 |
| 3,001,176 | 9/1961 | Ingham | 340—164 |
| 3,005,872 | 10/1961 | Vierling | 178—33 |
| 3,046,526 | 7/1962 | Scantlin | 178—4.1 |
| 3,080,547 | 3/1963 | Cooper | 340—168 |
| 3,084,219 | 4/1963 | Durkee | 178—34 |
| 3,166,735 | 1/1965 | Clark | 340—164 |
| 3,171,098 | 2/1965 | Gabrielson | 340—164 |

NEIL C. READ, *Primary Examiner.*

R. H. ROSE, A. J. DUNN, T. A. ROBINSON, *Examiners.*